US012254475B1

(12) United States Patent
Ellis

(10) Patent No.: US 12,254,475 B1
(45) Date of Patent: Mar. 18, 2025

(54) CHECK FRAUD DETECTION SYSTEM AND METHOD

(71) Applicant: Headsail Technologies, Inc., Rogers, AR (US)

(72) Inventor: Greg Ellis, Sherwood, AR (US)

(73) Assignee: Headsail Technologies, Inc., Rogers, AR (US)

( * ) Notice: Subject to any disclaimer, the term of this patent is extended or adjusted under 35 U.S.C. 154(b) by 0 days.

(21) Appl. No.: 18/937,717

(22) Filed: Nov. 5, 2024

Related U.S. Application Data

(63) Continuation of application No. 18/828,819, filed on Sep. 9, 2024.

(51) Int. Cl.
*G06Q 20/40* (2012.01)
*G06Q 20/04* (2012.01)
*G06V 30/146* (2022.01)

(52) U.S. Cl.
CPC ....... *G06Q 20/4016* (2013.01); *G06Q 20/042* (2013.01); *G06V 30/147* (2022.01)

(58) Field of Classification Search
CPC . G06Q 20/4016; G06Q 20/042; G06V 30/147
See application file for complete search history.

(56) References Cited

U.S. PATENT DOCUMENTS

| | | | |
|---|---|---|---|
| 8,452,689 B1 | 5/2013 | Medina, III | |
| 8,625,875 B2 | 1/2014 | Csulits et al. | |
| 10,210,522 B1 * | 2/2019 | Medina, III | G06Q 20/042 |
| 10,755,277 B2 * | 8/2020 | Shakkarwar | G06Q 20/2295 |
| 11,100,571 B1 * | 8/2021 | Hecht | G06Q 20/322 |
| 11,328,350 B1 * | 5/2022 | Hecht | G06Q 20/4014 |
| 11,468,410 B2 * | 10/2022 | Eliscu | G06Q 20/023 |
| 12,051,105 B1 * | 7/2024 | Hecht | G06V 30/224 |
| 2017/0069019 A1 * | 3/2017 | Kendall | G06Q 40/02 |
| 2021/0224800 A1 * | 7/2021 | Bloy | G07F 17/0035 |
| 2022/0253839 A1 * | 8/2022 | Kolchin | G06Q 20/108 |

(Continued)

FOREIGN PATENT DOCUMENTS

WO 2018111080 A1 6/2018

OTHER PUBLICATIONS

Bogahawatte et al , "Online Digital Cheque Clearance and Verification System using Block Chain," 2021 6th International Conference for Convergence in Technology (I2CT), Maharashtra, India, 2021, pp. 1-9, doi: (Year: 2021).*

(Continued)

*Primary Examiner* — Andrae S Allison

(57) ABSTRACT

A check processing system detects fraud in real-time by comparing data from presented checks against known check data stored in a Global Check Register (GCR). The system analyzes check images and extracts payee information. Instead of reviewing the entire check for each item of information, a region of interest (ROI) is investigated. The use of an ROI defeats a type of fraud wherein original payee information is placed on the memo line of the check with the payee information changed to a fraudulent payee name. By validating the presented check data against known data points, the system can identify discrepancies and potential fraud in real-time, generating events and notifications for bank employees to take appropriate action in a timely manner.

10 Claims, 11 Drawing Sheets

(56) References Cited

U.S. PATENT DOCUMENTS

| | | |
|---|---|---|
| 2022/0309516 A1 | 9/2022 | Rhoads et al. |
| 2022/0398399 A1 | 12/2022 | Muffat et al. |
| 2024/0378589 A1* | 11/2024 | Kolchin ............ G06Q 20/0855 |

OTHER PUBLICATIONS

Thakur, Neha, Deepika Ghai, and Sandeep Kumar. "Automatic imagery Bank Cheque data extraction based on machine learning approaches: a comprehensive survey." Multimedia Tools and Applications 82.20 (2023): 30543-30598. (Year: 2023).*

Agrawal, Prateek et al., "Automated Bank Cheque Verification Using Image Processing and Deep Learning Methods," retrieved from https://www.semanticscholar.org/paper/Automated-bank-cheque-verification-using-image-and-Agrawal-Chaudhary/2d9c5f1a3f256852be40176eead5fcc398c8fe7e (Oct. 6, 2023).

"OCR (Optical Character Recognition) with world-class Google Cloud AI," retrieved from https://cloud.google.com/use-cases/ocr (Mar. 19, 2024).

Bais, Gourav, "Building Deep Learning-Based OCR Model: Lessons Learned," retrieved from: https://neptune.ai/blog/building-deep-learning-based-ocr-model (Sep. 12, 2023).

Machine translation of application serial No. WO2018111080 (published Jun. 21, 2018).

Gundlapalli, Chandra et al., "Automated Instruments (Bank Cheque Draft) Clearance," retrieved from: https://www.researchgate.net/publication/371965683_Automated_Instruments_Bank_Cheque_Draft_Clearance (Jan. 2023).

* cited by examiner

| | X | 0 | 1 | 2 | 3 | 4 | 5 | 6 | 7 | 8 | 9 | 10 | 11 |
|---|---|---|---|---|---|---|---|---|---|---|---|---|---|
| Y | | s | o | m | e | o | n | e | n | i | c | e | |
| 0 | s | 1 | 0 | 0 | 0 | 0 | 0 | 0 | 0 | 0 | 0 | 0 | 0 |
| 1 | o | 0 | 1 | 0 | 0 | 1 | 0 | 0 | 0 | 0 | 0 | 0 | 0 |
| 2 | m | 0 | 0 | 1 | 0 | 0 | 0 | 0 | 0 | 0 | 0 | 0 | 0 |
| 3 | e | 0 | 0 | 0 | 1 | 0 | 0 | 1 | 0 | 0 | 0 | 1 | 0 |
| 4 | o | 0 | 1 | 0 | 0 | 1 | 0 | 0 | 0 | 0 | 0 | 0 | 0 |
| 5 | n | 0 | 0 | 0 | 0 | 0 | 1 | 0 | 1 | 0 | 0 | 0 | 0 |
| 6 | e | 0 | 0 | 0 | 1 | 0 | 0 | 1 | 0 | 0 | 0 | 1 | 0 |
| 7 | n | 0 | 0 | 0 | 0 | 0 | 1 | 0 | 1 | 0 | 0 | 0 | 0 |
| 8 | i | 0 | 0 | 0 | 0 | 0 | 0 | 0 | 0 | 1 | 0 | 0 | 0 |
| 9 | e | 0 | 0 | 0 | 1 | 0 | 0 | 1 | 0 | 0 | 0 | 1 | 0 |
| 10 | c | 0 | 0 | 0 | 0 | 0 | 0 | 0 | 0 | 0 | 1 | 0 | 0 |
| 11 | e | 0 | 0 | 0 | 1 | 0 | 0 | 1 | 0 | 0 | 0 | 1 | 0 |

*FIG. 6A*

| | | X | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 |
| Y | 0 | 1 | 1 | 1 | 0 | 0 | 0 | 1 | 1 | 1 | 0 | 0 | 0 |
| | 1 | 0 | 0 | 0 | 0 | 0 | 0 | 0 | 0 | 0 | 1 | 1 | 0 |
| | 2 | 0 | 0 | 0 | 0 | 0 | 0 | 0 | 0 | 0 | 0 | 0 | 0 |
| | 3 | 0 | 0 | 0 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |
| | 5 | 0 | 0 | 0 | 0 | 0 | 0 | 0 | 0 | 0 | 0 | 0 | 0 |
| | 6 | 0 | 0 | 0 | 0 | 0 | 0 | 0 | 0 | 0 | 0 | 0 | 0 |
| | 7 | 0 | 0 | 0 | 0 | 0 | 0 | 0 | 0 | 0 | 0 | 0 | 0 |
| | 8 | 0 | 0 | 0 | 0 | 0 | 0 | 0 | 0 | 0 | 0 | 0 | 0 |
| | 9 | 0 | 0 | 0 | 0 | 0 | 0 | 0 | 0 | 0 | 0 | 0 | 0 |
| | 10 | 0 | 0 | 0 | 0 | 0 | 0 | 0 | 0 | 0 | 0 | 0 | 0 |
| | 11 | 0 | 0 | 0 | 0 | 0 | 0 | 0 | 0 | 0 | 0 | 0 | 0 |

*FIG. 6B*

| | | | | | | | | | | | | Row Sum | RowPctOfSize | RowWeight | RowScore |
|---|---|---|---|---|---|---|---|---|---|---|---|---|---|---|---|
| | 0 | 0 | 0 | 1 | 1 | 1 | 0 | 0 | 0 | 1 | 1 | 9 | 75.00000 | 1.000000 | 75.000% |
| | 0 | 1 | 1 | 0 | 0 | 0 | 0 | 0 | 0 | 0 | 0 | 2 | 16.66667 | 0.916667 | 15.278% |
| | 0 | 0 | 0 | 0 | 0 | 0 | 0 | 0 | 0 | 0 | 0 | 0 | 0.00000 | 0.833333 | 0.000% |
| | 0 | 0 | 0 | 0 | 0 | 0 | 0 | 0 | 0 | 0 | 0 | 0 | 0.00000 | 0.750000 | 0.000% |
| | 0 | 0 | 0 | 0 | 0 | 0 | 0 | 0 | 0 | 0 | 0 | 0 | 0.00000 | 0.666667 | 0.000% |
| | 0 | 0 | 0 | 0 | 0 | 0 | 0 | 0 | 0 | 0 | 0 | 0 | 0.00000 | 0.583333 | 0.000% |
| | 0 | 0 | 0 | 0 | 0 | 0 | 0 | 0 | 0 | 0 | 0 | 0 | 0.00000 | 0.500000 | 0.000% |
| | 0 | 0 | 0 | 0 | 0 | 0 | 0 | 0 | 0 | 0 | 0 | 0 | 0.00000 | 0.416667 | 0.000% |
| | 0 | 0 | 0 | 0 | 0 | 0 | 0 | 0 | 0 | 0 | 0 | 0 | 0.00000 | 0.333333 | 0.000% |
| | 0 | 0 | 0 | 0 | 0 | 0 | 0 | 0 | 0 | 0 | 0 | 0 | 0.00000 | 0.250000 | 0.000% |
| | 0 | 0 | 0 | 0 | 0 | 0 | 0 | 0 | 0 | 0 | 0 | 0 | 0.00000 | 0.166667 | 0.000% |
| | 0 | 0 | 0 | 0 | 0 | 0 | 0 | 0 | 0 | 0 | 0 | 0 | 0.00000 | 0.083333 | 0.000% |
| | | | | | | | | | | | | | | | 90.278% |

*FIG. 6C*

CHECK FRAUD DETECTION SYSTEM AND METHOD

BACKGROUND OF THE INVENTION

This application is a continuation of U.S. patent application Ser. No. 18/828,819, filed on Sep. 9, 2024. Such application is incorporated by reference as if fully set forth herein.

BACKGROUND OF THE INVENTION

Check fraud is a form of financial crime that occurs when an individual or group illegally uses checks to acquire or borrow funds that do not exist within the account balance belonging to such individual or group. Fraudulent activities include forgery (i.e., endorsing a check without authorization or falsifying the drawer's signature); alteration (i.e., changing the details on a check, such as the payee name or amount, after the check is issued); counterfeiting (i.e., creating fake checks from scratch using advanced printing and computer technologies); and theft (i.e., stealing legitimate checks, often from mailboxes, to alter or endorse to a fraudulent payee.

Check fraud is a costly issue for banks and other financial institutions, leading to billions of dollars in losses annually. These costs stem from the direct losses of the fraudulent transactions as well as the associated administrative costs of investigating and rectifying fraudulent activities. Furthermore, this fraud affects customer trust and can lead to increased regulatory scrutiny. Improved systems and methods to detect and prevent check fraud are therefore desirable.

SUMMARY OF THE INVENTION

The present invention is directed to a check processing system and method that improves the ability to detect and prevent check fraud.

In certain embodiments, the system processes checks in real-time, quickly identifying fraudulent transactions before they can be completed.

In certain embodiments, the system uses artificial intelligence (AI) and machine learning to scrutinize checks for inconsistencies, comparing the checks against a vast repository of known good data to detect anomalies.

In certain embodiments, the system may, upon detecting fraudulent activity, immediately alert the financial institution, allowing for swift action to prevent the transaction and mitigate potential losses.

In certain embodiments, the system provides enhanced security, which strengthens the overall security framework of financial institutions, reducing the incidence of check fraud and protecting against related financial and reputational damage.

By integrating these advanced technological measures, the system and method according to certain embodiments of the invention offers a powerful and efficient tool for financial institutions to safeguard against the pervasive threat of check fraud, ultimately saving these institutions substantial costs and maintaining their integrity in the financial sector.

These and other features, objects and advantages of the present invention will become better understood from a consideration of the following detailed description of the preferred embodiments and appended claims in conjunction with the drawings as described following:

BRIEF DESCRIPTION OF DRAWINGS

FIGS. 6A, 6B, and 6C are example matrices illustrating the comparative text scoring process according to an embodiment of the present invention.

DETAILED DESCRIPTION OF THE INVENTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1A:
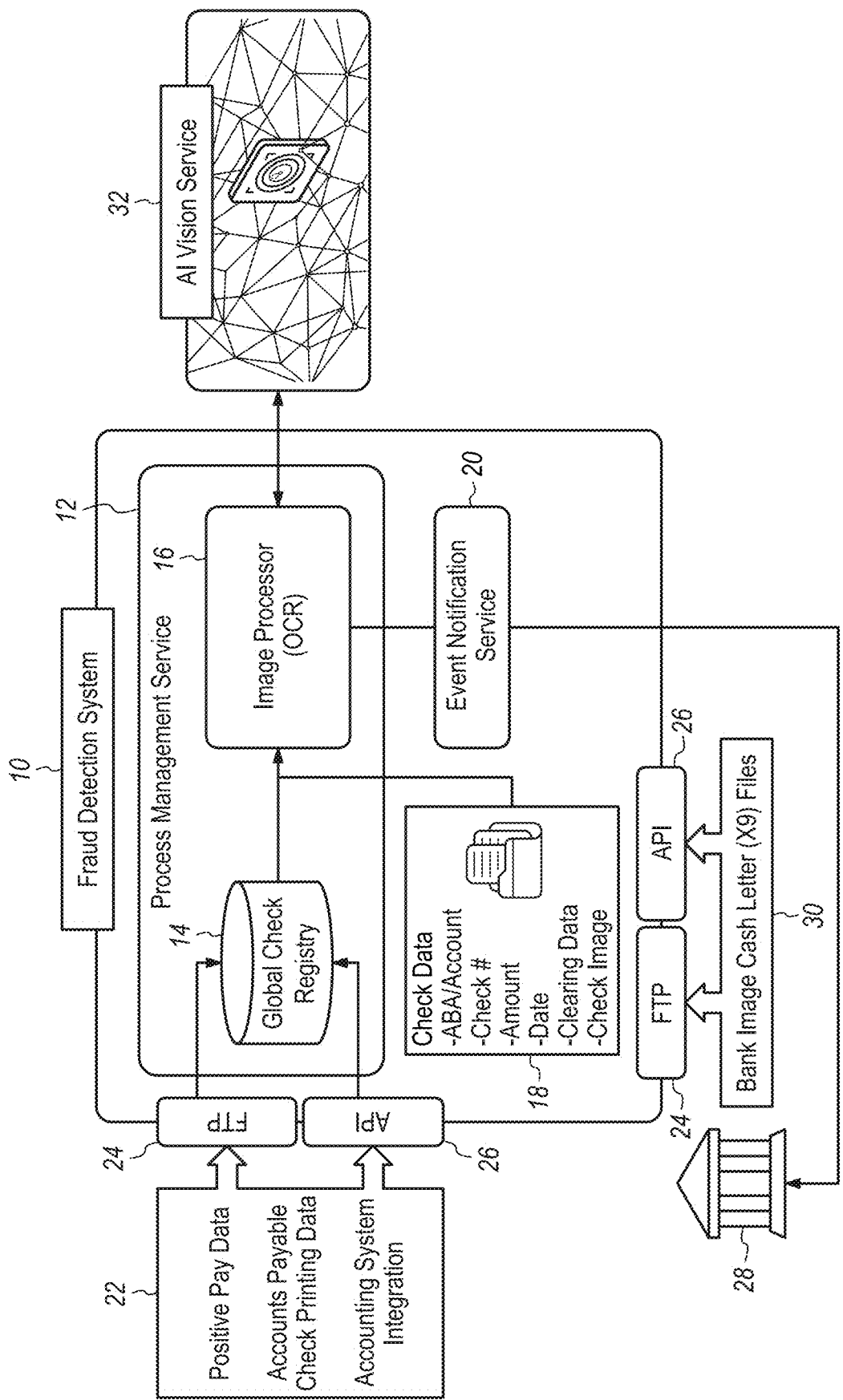
FIG. 1A is a block diagram showing the key components of a system according to an embodiment of the present invention.
Figure 1B:
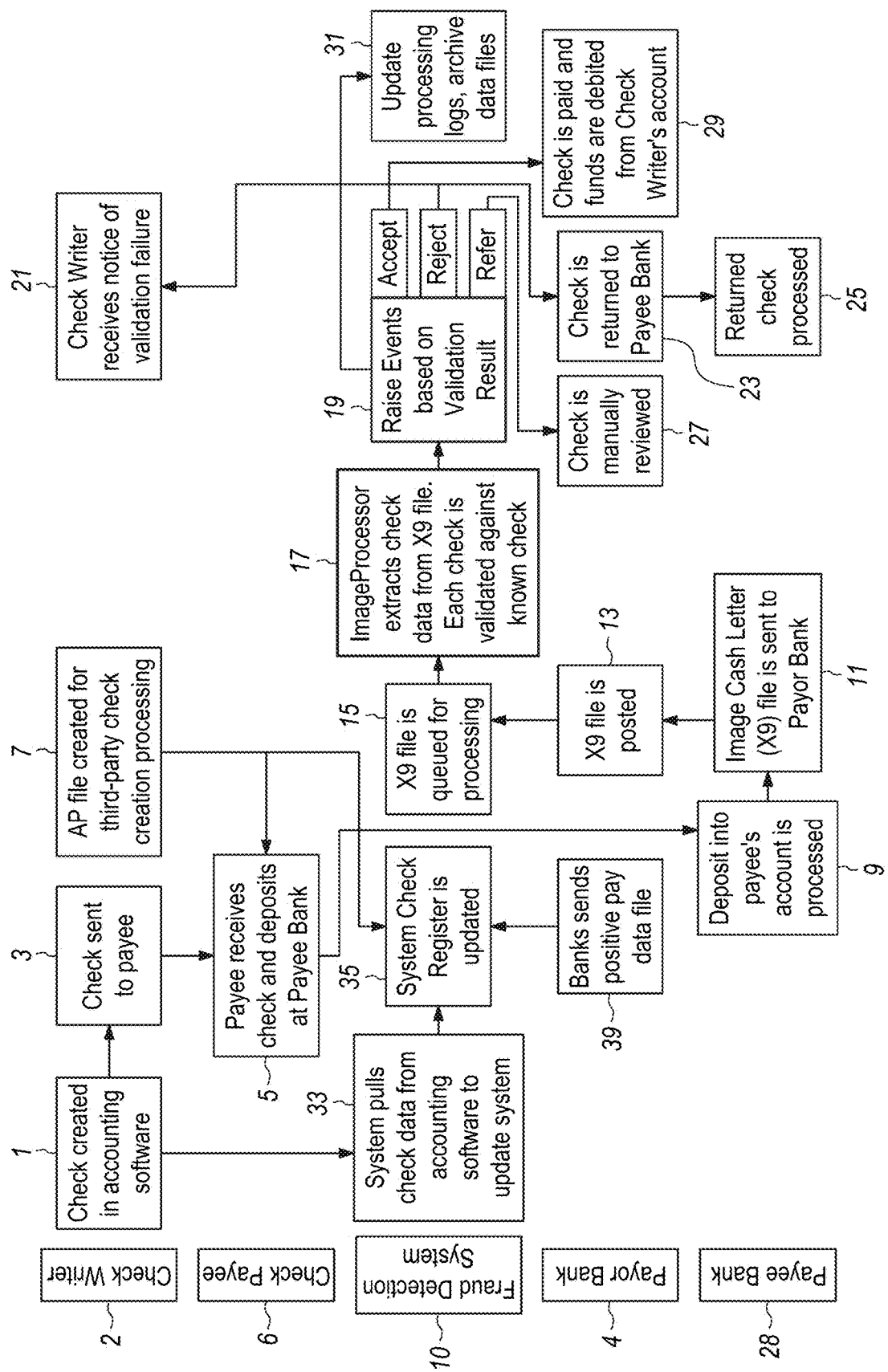
FIG. 1B is a swim lane diagram showing operations of the key components of the system according to an embodiment of the present invention.

In an embodiment, a system to detect check fraud comprises a number of key components as depicted in FIG. 1A, which perform operations as generally shown in the swim lane diagram of FIG. 1B. Global Check Register (GCR) 14 is a database that is a part of the fraud detection system 10. It stores known check data, including date written, check number, payee, amount, ABA routing number, and a hashed account number. Image processor 16 is a module that decodes check data and images from the Image Cash Letter (X9) files (described more fully below) received from banks, including payor bank 4. Image processor 16 analyzes check images using Optical Character Recognition (OCR) and, optionally, vision AI 32 to extract and validate payee information. In one implementation, vision AI 32 is a third-party product such as Azure AI Vision from Microsoft Corporation, or Claude 3.5 from Anthropic, but the invention is not limited to these examples. A check comparison engine 18 compares the data from the presented check against the known check data in GCR 14. An event notification service 20 generates and manages events based on the results of the check validation process, notifying relevant parties via short message service (SMS, i.e., text) or email. A client portal is a web-based interface for financial institution employees to view reports, receive alerts, and respond to events.

In an embodiment, a process using the key components of the system shown in FIG. 1A may be described in overview, with reference particularly to FIG. 1B. Such system works directly with financial institutions (e.g., banks) to validate checks presented for payment against known data points on the checks. When a check is written by check writer 2 at step 1, in some cases by being created by accounting software, the check is sent to check payee 6 at step 3. The following check details are collected and stored in GCR 14: date written, check number, payee, amount, ABA routing number, and account number. Check writer 2 may create an accounts payable (AP) file for third-party check processing at step 7.

If the check is created by accounting software at step 1, that software may optionally be integrated with fraud detection system 10 such that it pulls check data from the accounting software directly at step 33. In that case, GCR 14 is then updated at step 35, and payor bank 4 may send a corresponding pay data file to GCR 14 at step 39.

For security purposes, the account number is hashed in GCR 14 in such a way it is impossible to re-construct the account number from the information stored in GCR 14. This information can be collected via the bank's current positive pay system at step 39 or via integration with third-party check-writing services.

The check payee 6 receives the check and deposits it to payee bank 28 at step 5. Once the check payee 6 deposits the check with payee bank 28 at step 9, it scans the check at the point of deposit. The check data is then added, along with its image, to an Image Cash Letter (ICL) file 30, commonly referred to within the financial services industry as an X9 file, at step 11. X9 files are the means by which banks transmit check data to other banks.

When payor bank 4 receives the check information in the X9 file 30, a copy of X9 file 30 is transmitted to the fraud detection system 10 at step 13, and is then queued for processing at step 15. Image processor 16 decodes the check data using OCR and check images from the file at step 17. Each of the checks contained in the file are compared against the check information contained in GCR 14.

The comparison process first validates the amount on the presented check to the amount stored in GCR 14 at step 19. If the amounts are equal, then the process continues and validation of the payee information begins. The payee validation begins with defining a region of interest on the image where the payee information resides and creating a payee image. (This process is described in more detail below with reference to FIG. 4.) After performing additional image manipulations, the image is read by image processor 16 to see if the known payee from the GCR is found in the image.

After the OCR analysis is completed, the payee image is then optionally submitted to the vision AI service 32 to see if the payee matches the known payee in the GCR 14. Both the OCR and vision AI results are scored. Based on the results of the comparisons and the related scores, the system determines to either accept the check, reject the check, or refer the check for manual review, at step 19. Scoring is described in more detail below with reference to FIGS. 5A, 5B, and 5C.

In the event of an "accept" determination, the check is paid by payor bank 4 and funds are debited from the account of check writer 2, at step 29. The fraud detection system 10 then updates its logs, and archives data files at step 31.

In the event of a "reject" or "refer" determination, the system creates an event. Various individuals, both at the payor bank 4 and at the provider of the fraud detection system 10, can subscribe to various events through the client portal. When a user subscribes to an event, that user is notified immediately of the event via either SMS text message or email, based on saved preferences. Due to the time-sensitive nature of these events, status monitoring on the events will send reminder notices based on pre-determined time intervals.

When the bank receives an event notice that a check has been presented that does not match the information in GCR 14, the bank can return the item unpaid and alert the bank customer. The check writer 2 may receive a notification of the rejection at step 21. The check may also be returned to payee bank 4 at step 23, and then the returned check may be processed by payee bank 28 at step 25. If at step 19 the determination is made to refer the check for manually processing, then the check is manually reviewed by an agent of payor bank 4 at step 27.

When a bank becomes a client of the fraud detection system 10 provider in certain embodiments, an implementation project is first created that defines all the required setup and processes required. To minimize project risk and streamline the implementation, requirements for the bank are minimal. The primary tasks that must be completed are user setup, event configuration, and connectivity for transmission of data files from the bank to the provider at fraud detection system 10.

In the user setup phase, once the bank has been set up in the system, a bank employee is defined as the company administrator for the bank. The company administrator, operating from a networked computer at the bank, creates the individual user accounts in the client portal. Individual user accounts allow users to view reports, receive alerts, and respond to alerts within the client portal.

Event configuration describes the process by which bank users may subscribe to be shown events through the client portal. Several potential events may be raised by the system, each of which may be subscribed to by bank users. This allows each user to automatically receive messages when various events are created. For example, when a check is presented on an account and the amount of the check does not match the know amount, an event may be created. Any user subscribed to this event would receive an immediate notification.

Prior to processing an X9 file 30, the file will be sent to the system for analysis. This data file can be sent via a web service, or the bank may use secure file transfer protocol (SFTP) to send the file. For security reasons, the SFTP location will be protected by firewall settings that only allow certain whitelisted IP addresses to access the SFTP location. In some cases a virtual private network (VPN) connection may be required by the bank for enhanced security as well.

The fraud detection system 10, in certain embodiments, requires data from check writers to populate the global check register (GCR) 14, and X9 files 30 containing check data from banks attempting to clear checks. Both types of data may be received by either secure file transfer protocol (SFTP) transmission or via a web service application programming interface (API).

GCR data can be sent directly from the bank or the bank's individual clients via an integration with the bank client's accounting system. This data is stored in GCR 14 and is used to validate the check data presented in the X9 file 30. The data collected for GCR 14 in certain embodiments consists of the check number, date written, payee, and amount.

An X9 file 30, as described above and also known as an Image Cash Letter (ICL) file, is a standardized file format used in the banking industry for the electronic exchange of check images and associated information. This format is defined by the ANSI X9.100-187 standard, which specifies the layout for electronic files containing check images to be sent to and processed by banks. The X9 file 30 enables banks to handle check deposits electronically rather than dealing with physical checks, thus facilitating faster and more efficient check processing. As banks are processing X9 check files 30 for clearing, a copy of the X9 file 30 will be sent to the fraud detection system 10 to compare the data on the checks contained within the file to the data within GCR 14.

With this background, and continuing with reference to FIGS. 1A and 1B, a process for utilizing fraud detection system 10 may now be described. The process begins with check creation and distribution. A check writer 2 (i.e., the party issuing the check) generates a check within its accounting software at step 1. The check is then sent to the payee (i.e., the party receiving the check) at step 3. Parallel to this, an accounts payable (AP) file is created at step 7 for third-party check creation processing at accounting function 22. The check payee 6 receives the check and deposits it at their bank, known as the payee bank 28, at step 9. Accounting function 22 may interact with the fraud detection system 10 by sending data through system FTP 24 or system API 26.

To process the check, the payee bank 4 creates an Image Cash Letter (X9) file 30, which contains the digital image of the check. This is sent to the payor bank (the bank of the check writer), shown as bank 28 in FIG. 1. The payor bank 4 then sends X9 file 30 to fraud detection system 10 for analysis, using either system FTP 24 or system API 26, as desired by payor bank 4.

The X9 file 30 is queued for processing by fraud detection system 10. Image processing occurs on all checks found in the X9 file 30 at image processor (i.e., OCR system) 16, which is a part of process management service 12 of fraud detection system 10. Optionally, an external vision AI service 32 may also be used to provide image processing to provide additional data, such as in the case when image processor 16 returns a result that there is no match.

The image processor 16 returns a result object that contains the full result set of the analysis. Based on the validation result, fraud detection system 10 will recommend to payee bank 28 that it accept the check if it matches known data; that it reject the check if discrepancies are found, indicating potential fraud; or refer the check for manual review if it requires further investigation, at step 19. In addition to recommending an action for the check, the result object contains data points related to confidence scoring of the analysis and various other data points.

Based on the results of the analysis, fraud detection system 10 will update its internal logs and create the appropriate notification events within the event notification service 20 at step 31. For accepted checks, the payor bank 4 updates processing logs and archives data files, the check is paid, and funds are debited from the check writer's account at step 29. For rejected or referred checks, the check writer 2 receives a notice of validation failure at step 21, and the check may be manually reviewed by the payor bank 4 at step 27. If determined to be fraudulent, the check is returned to the payee bank 28 at step 23. At the payee bank 28, the returned check may then be processed accordingly in a normal fashion.

This process flow ensures that from the moment a check is issued up until the final point of completion, fraud detection system 10 provides a rigorous security measure, vetting every transaction and acting as a shield against check fraud. It highlights the fraud detection system 10's role in real-time analysis and fraud prevention, demonstrating a systematic approach to protecting both check writers and payees in financial transactions.

Figure 2:
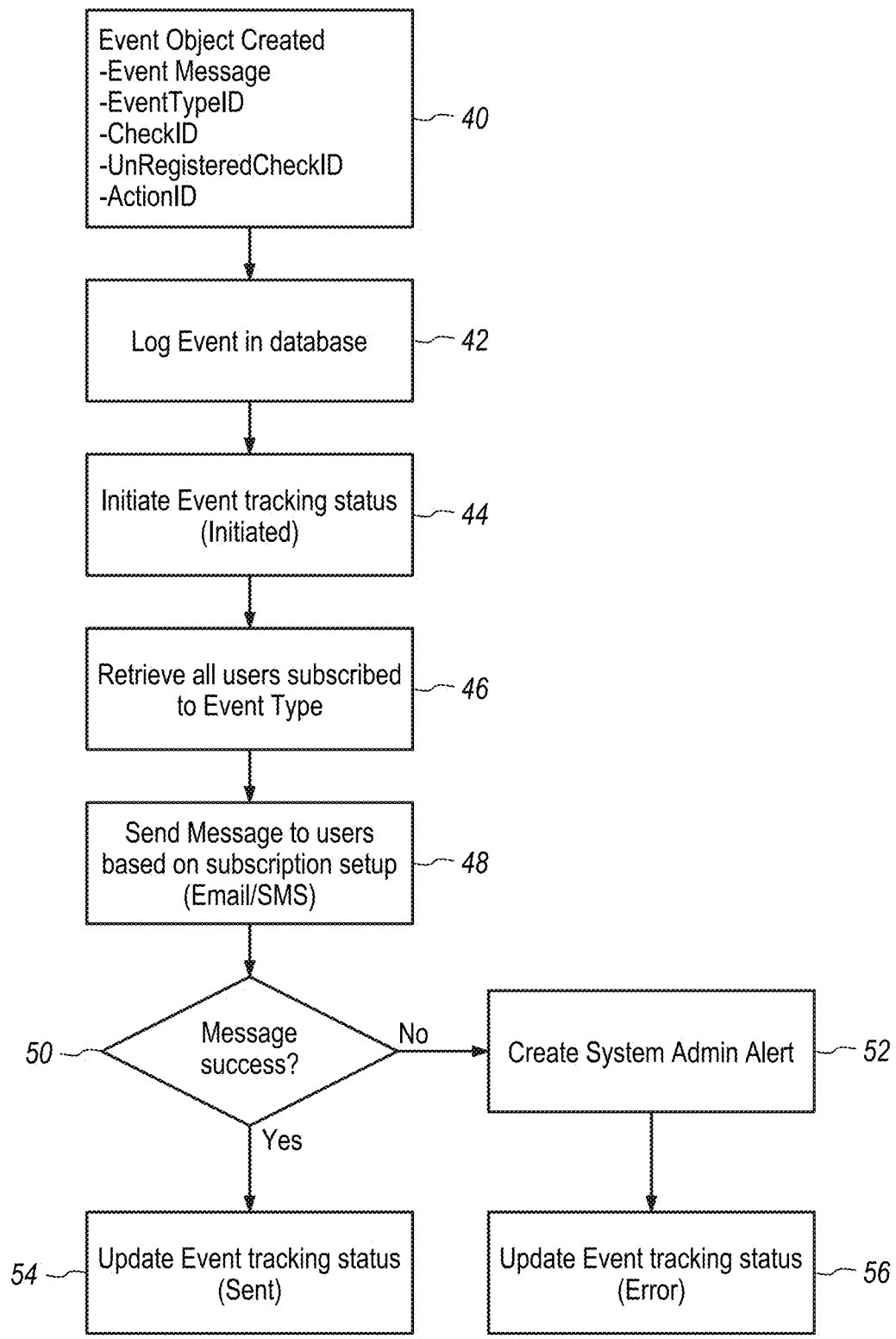
FIG. 2 is a flowchart showing the event managing system process flow according to an embodiment of the present invention.

Referring now to the flow chart of FIG. 2, the process flow within event notification service 20 may be described in greater detail. When anomalies are detected between the known data points within the GCR 14 (shown in FIG. 1) and the data obtained from the X9 30 check data, it is imperative the bank be alerted as soon as possible in order to prevent payment of the presented check and avoid financial losses that may arise. To facilitate this, fraud detection system 10 implements a robust event management system, as implement and shown in FIG. 1 as event notification service 20.

When an event is created at step 40 of FIG. 2, the details including the Event Message, Event Type Identifier, Check Identifier and Action Type, are stored in the Event Queue at step 42. A separate process executes to process all events pended in the queue. This process first fetches any pending events from the queue, and then loops through the events performing the same steps for each.

For each event, the next step is to determine the Event Type and Account Information from the event data and initiate tracking at step 44. Then at step 46 the event notification service 20 retrieves a list of users that are subscribed to the Event Type for the specific company related to the check that caused the event at step 46. At step 48, the event notification service 20 determines the messaging type (SMS, email, or both) that the user has selected for its default notification method. Then, also at step 48, it constructs the messages to be delivered to the user based on the findings related to the event. Details may include a hypertext transfer protocol (HTTP) link that allows the user to view the event details immediately.

At step 20, the system queries whether the message was successfully sent to the user. If the message fails, then the system creates a system administrator alert at step 52 so that appropriate actions may be immediately taken, and the error is shown in Update Event tracking status at step 56. If the message is sent successfully, then processing proceeds to Update Event tracking status to show a successful send at step 54.

Figure 3:
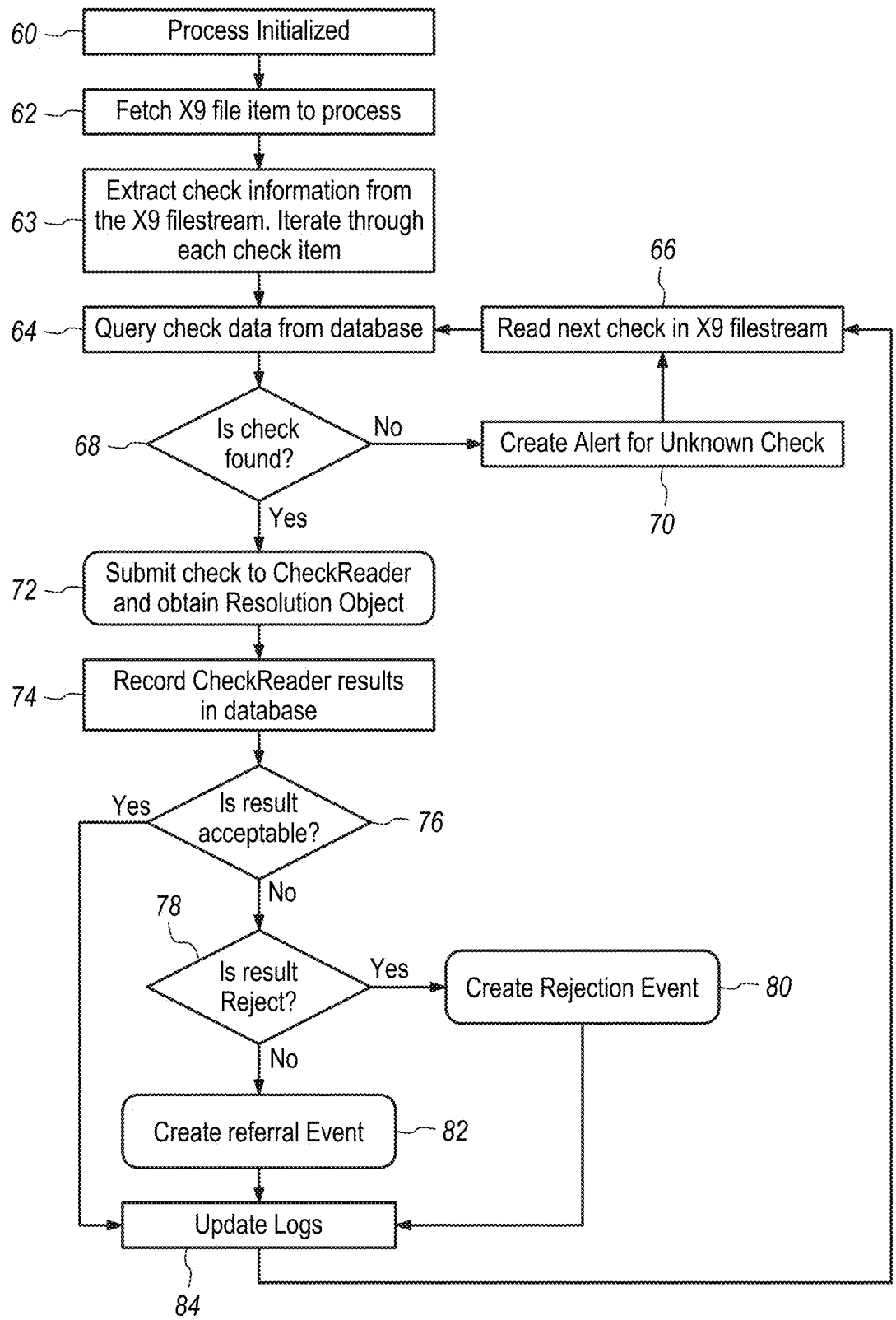
FIG. 3 is a flowchart showing the image processor process flow according to an embodiment of the present invention.

The flow chart of FIG. 3 provides additional detail concerning the operating of image processor 16. The process begins with the initialization of the system responsible for processing checks at step 60. The system fetches an item from the X9 file 30 to process at step 62. This file contains one or more check images and associated data.

Next, at step 63, check information is extracted from the X9 file 30 stream. The system iterates through each check item within the X9 file 30. For each check item, the system queries the Global Check Register (GCR) database 14 to retrieve associated check data at step 66. If the check is found in GCR 14 at query step 68, the system proceeds with the next steps. If not, an alert is created for the unknown check at step 70. The alert is handled by event notification service 20 as described above with respect to FIG. 2.

Each check that is recognized by GCR 14 is submitted to the check reader 18 at step 72. (Note that the processing steps of check reader 18 will be described more fully below with respect to FIG. 4.) Check reader 18 returns a Resolution Object, which contains the results of the check analysis. The results from check reader 18 are then recorded in GCR 14.

At query step 76, the system evaluates whether the result is acceptable. If the result is not acceptable, it continues to check if the result suggests rejection or referral at step 82. If the result is to reject the check, the system creates a Rejection Event at step 80. If the result does not warrant rejection, but the check does not meet the criteria for acceptance, the system creates a Referral Event, indicating that the check requires further review, at step 82. If the result is acceptable, the system updates the logs at step 84 to reflect the successful processing of the check.

After handling the current check, the system reads the next check in the X9 file 30 stream, and the process repeats back at step 66.

Figure 4:
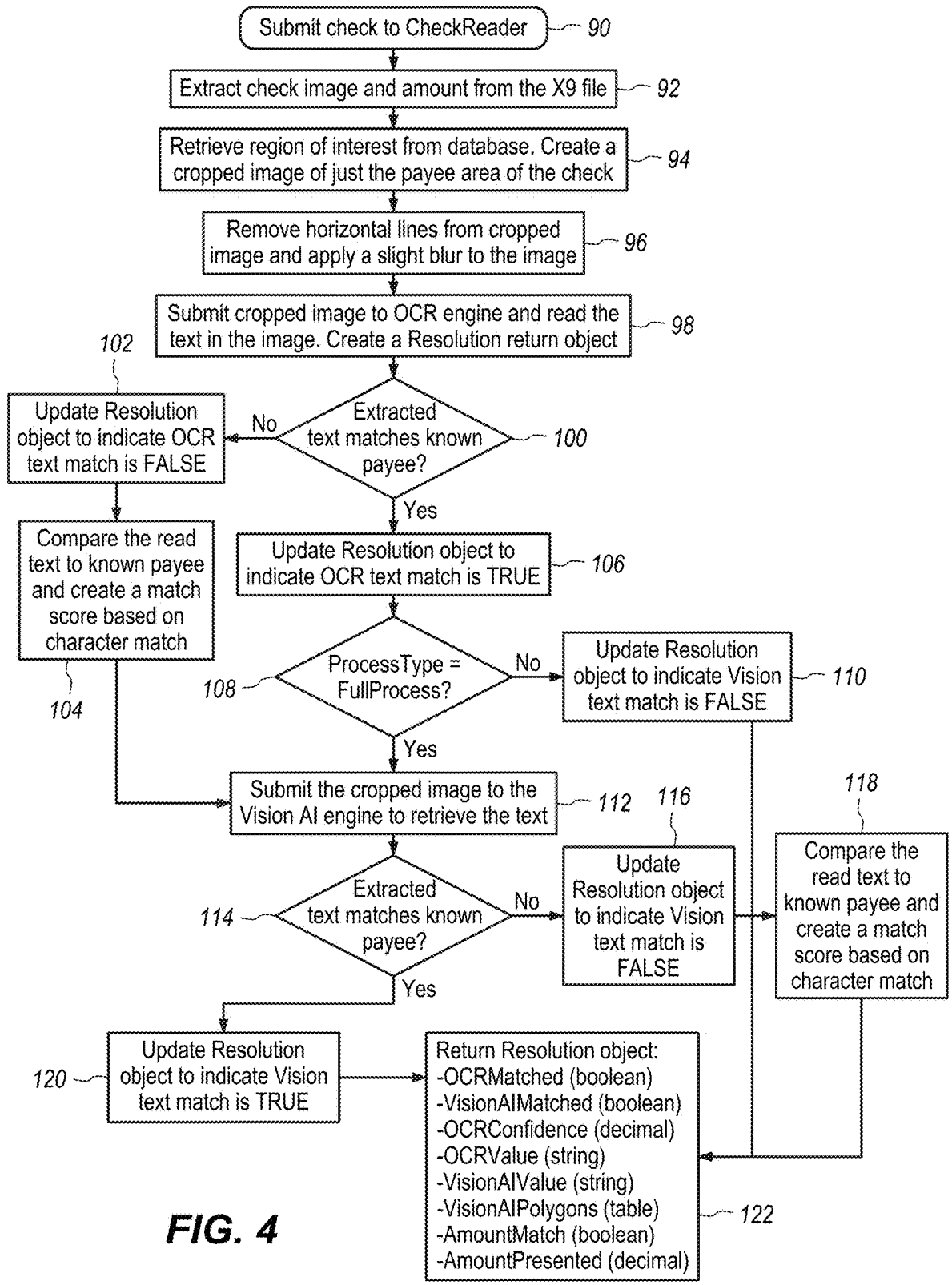
FIG. 4 is a flowchart showing the check reader process flow according to an embodiment of the present invention.

Check reader 18 processing, using image processor 16, may be more fully described with reference to the flow chart of FIG. 4. The check image is submitted to check reader 18 at step 90, along with the monetary amount of the check as reported in the X9 data file 30 received from the bank after extraction at step 92.

A region of interest (ROI) is defined at step 94, based on data stored in the database for the account from which the check is drawn. The region of interest is an area, in some embodiments being a rectangular area, that is cropped from the overall check image. This step improves the accuracy of the analysis. For example, suppose that a person was attempting to alter a check's payee information in an attempt to commit fraud. The original payee information may be placed on the memo line of the check with the payee information changed to a fraudulent payee name. In this scenario, OCR or AI tools would likely find the payee information on the overall check image and consider the check to be valid if the entire check is viewed. By limiting the analysis to the ROI surrounding the area of the check that contains the payee, the risk of encountering a false negative is greatly reduced.

Many times, the payee area of a check contains a horizontal line. After the ROI area has been cropped from the original check image, the cropped ROI image must be examined for horizontal lines and these lines must be removed at step 96 in order to increase the overall accuracy of the text extraction. In some cases, one or more letter of the payee text may cross the horizontal line. In this case, when the line is removed from the letter crossing the line will contain white space where the line crossed. To correct this, the image is blurred at step 96, which causes the pixels on either side of the white space to bleed out towards each other. This bleeding of the pixels results in the OCR (image processor 16) and optionally vision AI 32 recognizing the letter as if the white space did not exist. This manipulation of the cropped ROI image results in significantly higher accuracy.

At step 98, the manipulated ROI image is analyzed by the image processor 16 to determine the text value of the payee name contained in the image. The resolution object is created and the results of the OCR analysis are added to the resolution object. This data consists of the data observed in the payee region and the confidence score of the observation.

At query step 100, the observed value from the OCR analysis is compared to the known payee data from GCR 14. If the observed value matches the known payee, the resolution object is updated to indicate an OCR match at step 106. If the configuration settings for the analysis indicates that processing is to stop upon OCR match at query step 108, then then the resolution object's Vision property is set to false at step 110 (due to the fact the vision AI 32 service did not analyze the image) and the resolution object is returned to image processor 16 at step 122.

If the observed value does not match the known payee data at query step 100, then the resolution object is updated to reflect an OCR mis-match at step 102. The observed value and the known payee data values are compared at step 104 to create a score based on the similarity of the two values. (Scoring will be described in more detail below with reference to FIGS. 5A, 5B, and 5C.) The resolution object is updated to contain the comparative text score.

At step 112, the image is now submitted to the vision AI engine 32 to determine the value contained within the check's payee ROI. If the observed value does not match the known payee data at query step 114, then the system will submit the observed value and the known payee value to the comparative text scoring function at step 118 to create a match score and update the resolution object to indicate a vision AI mis-match at step 116. The system then returns the resolution object to image processor 16 at step 122.

If the observed value matches the known payee data at query step 114, then check reader 18 updates the resolution object to indicate a payee match at step 120, and returns the resolution object to image processor 16 at step 122.

Figure 5A:
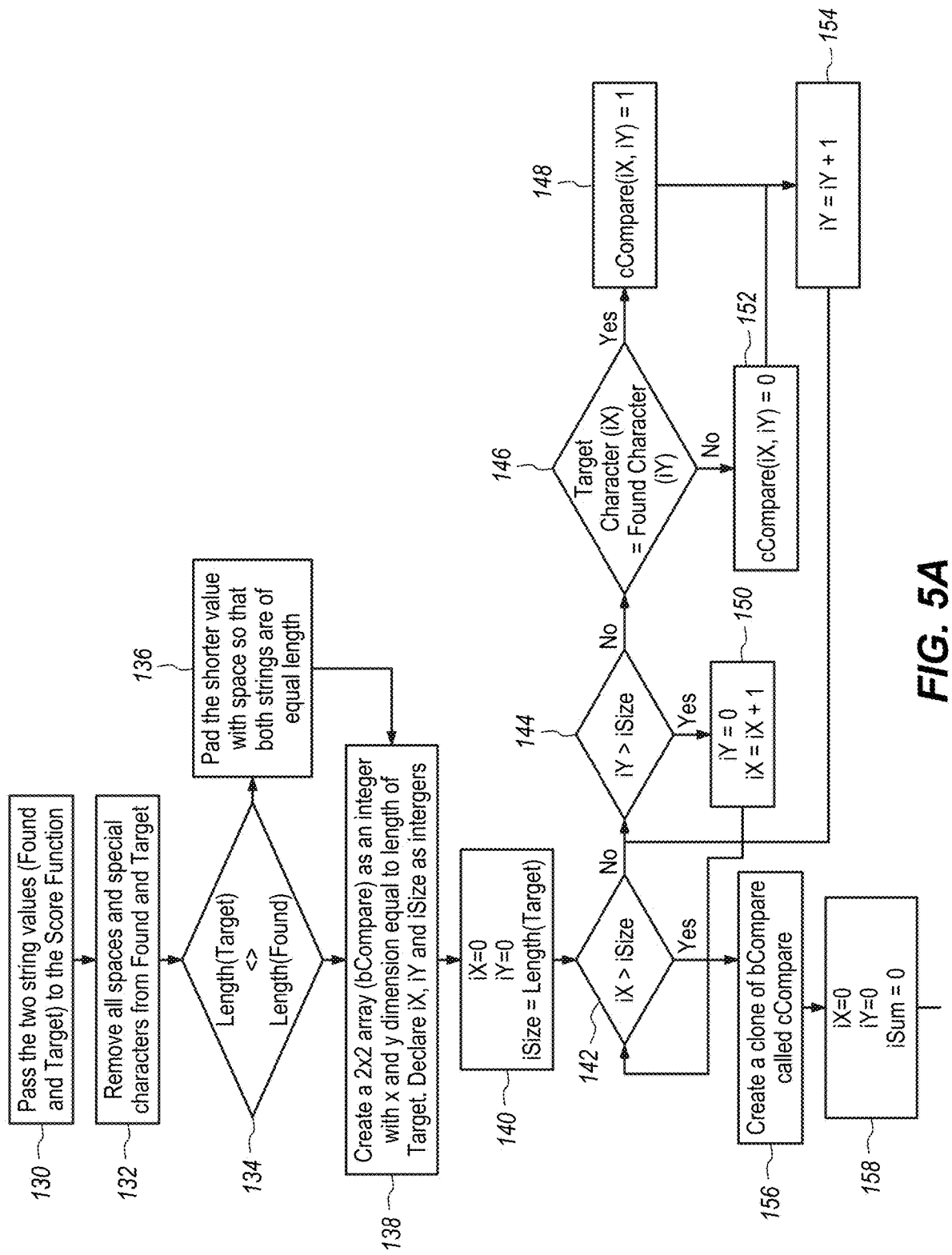
FIGS. 5A, 5B, and 5C are a flowchart showing the comparative text scoring process flow according to an embodiment of the present invention.
Figure 5B:
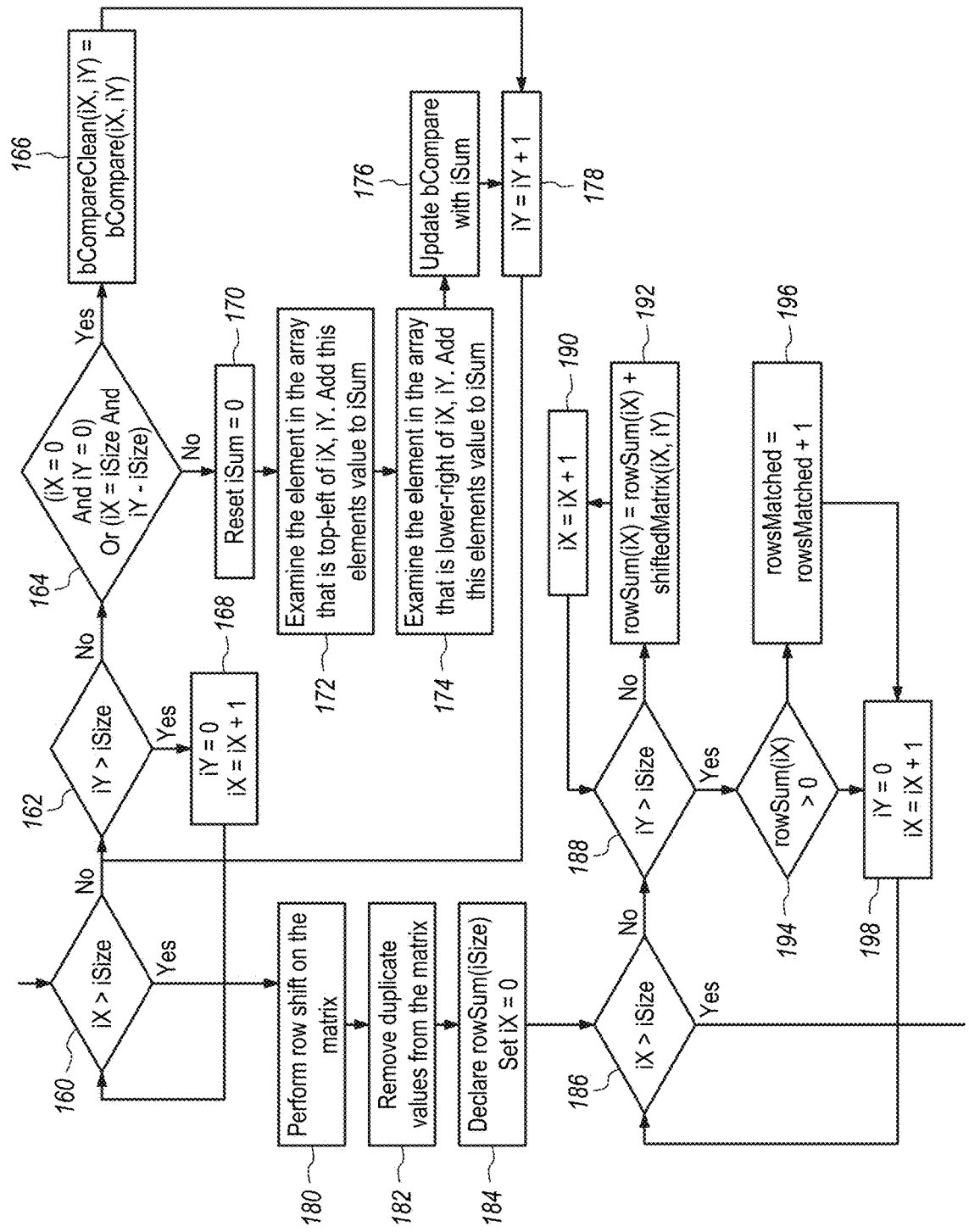
Figure 5C:
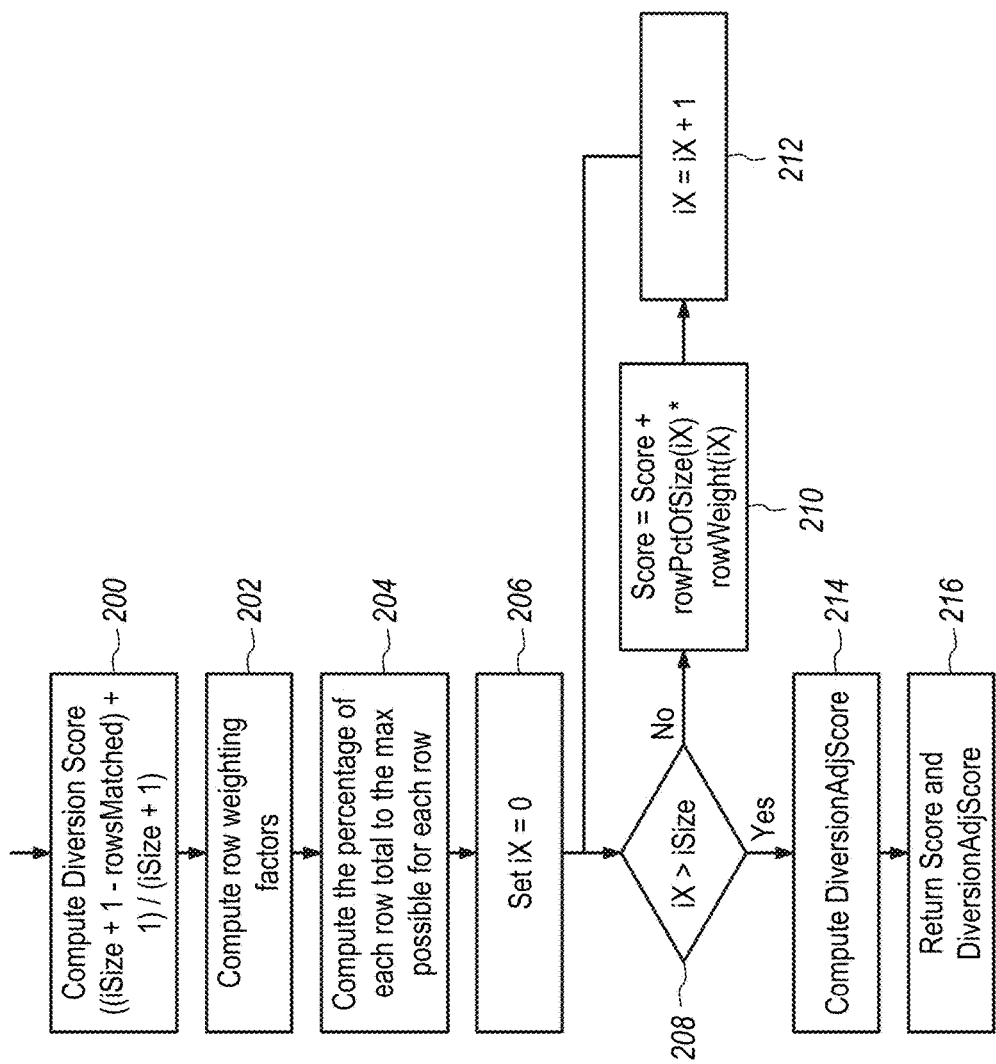

With reference now to the flow chart of FIGS. 5A, 5B, and 5C, the process for comparative text scoring within process management service 12 may be described in more detail. When an exact match is not found between the known payee text value (target) and the payee text extracted from the check image (found), this score is computed to determine a degree of similarity between the found text and the target text.

At step 130, the comparative text score function accepts two string values, referred to herein as strTarget and strFound, corresponding to the expected text string and the one actually read from the check, respectively. All spaces and special characters are removed from the string values and the values are converted to lower case at step 132. If the lengths of the strings are not equal as determined at query step 134, then the shorter string value is right padded with spaces at step 136. This ensures both values have the same length.

A two-dimensional array is created, referred to herein as bCompare, to store integer values at step 138. The array size is based on the size of the input strings. For example, assume the strings "Somethingofinterest" and "Somewhereofinterests" are being compared, then the calculation of the array size would be as follows, using the length of the longer string:

$$strFound = \text{"somethingofinterest"}$$

$$strTarget = \text{"somewhereofinterests"}$$

$$bCompare = \text{array of integers with size } 20 \times 20$$

Next, the array is populated based on a bit-wise comparison of the strings. In each cell within the matrix, the system compares the string character in the X row (expected) to the string character in the Y column (found). If the values are equal, then the system store the binary value "1" in the matrix, otherwise, the system store a "0". Specifically, the system at query step 142, checks whether the x value has exceeded the matrix row size. If not, then at query step 144 the system checks whether the y value has exceeded the matrix column size. If yes, then processing returns to query step 142 and the x value is incremented by 1. If no, then at query step 146 the system determines whether these two characters match in the target and found strings. If not, the binary "0" is stored in the matrix at step 152, and if so then the binary "1" is stored in the matrix at step 148. In either case, the y value is incremented by 1 at step 154, and processing returns to query step 144. In an example, this results in a bCompare matrix as shown in FIG. 6A (wherein the corresponding strings are "someonenice" and someone-niece").

It is noteworthy that when two strings are exactly equal, the cells on the diagonal from (0,0) through (11,11) will all be "1" and all other cells will be "0". Additionally, if a series of characters don't match two or more sequential values, then result will be values of "1" that are surrounded by "0"s. These results are considered "noise" for purposes herein. These noise results are removed from the matrix by replacing the "1" with "0". This noise removal process ignores all cells on the diagonal from cell (0,0) to cell (11,11), leaving them unchanged since they are the data of interest.

To perform noise removal, processing begins at step 156 with the creation of a clone matrix of bCompare, called herein bCompareClean. All x, y, and iSum (explained below) values for bCompareClean are initially set to zero at step 158. The process iterates through each x value (query step 160) and y value (query step 162), incrementing for each subsequent x value at step 168 and each y value at step 178 in order to process over the entirety of each matrix.

At query step 164, the system determines if the x and y values are both zero, or if the value in question is along the diagonal from (0,0) to (n,n). If either of these conditions is true, then the corresponding element of bCompareClean is set to be the same as the value in the corresponding cell of bCompare at step 166. This step keeps the diagonal portion of bCompareClean the same as the value in bCompare, and also keeps the cells intact that do not contain noise. If neither of these conditions are true, however, then at step 170 the iSum is set to "0" to remove noise. Then the element in the array that is to the upper left of the current cell is examined, and this element's value is added to the iSum at step 172.

After this, the element that is to the lower right of the current cell is examined, and this element's value is also added to the running iSum at step 174. The bCompare matrix is updated with the iSum value at step 176. After this process is iterated over each y value, so that there is an iSum value for each row, and at the end of the complete iterative process the noise is removed from the matrix as described above.

Next, the matrix must be shifted such that all values in column one are shifted up by 1 position, all values in column 2 are shifted up 2 positions, etc. with values wrapping from the top to the bottom of the matrix, performed at step 180, and duplicate values are removed at step 182. After performing noise removal and the shift transformation on the matrix of FIG. 6A, the values now are arranged as shown in FIG. 6B.

After shifting the matrix as shown in FIG. 6B, the system may begin the process of scoring the results. The scoring process is predicated on several fundamental principles. First, a perfect match is represented by a single row of "1" values in the top row. Second, phrases that are similar will result in one or more fragments of strings that match. Fragmentation is represented by shorter sequences of "1"s and dispersion of the sequences throughout the matrix. Third, string fragments that are close to each other will be represented closer to the top of the matrix, and fragments that are not close to each other will be appear lower in the matrix.

Scoring begins with adding the values of each row. These values are stored in an array, rowSum( ) as shown in FIG. 6C. RowPctOfSize is computed as the row sum divided by the number of values in the row, referred to herein as iSize. The row sum iX is initially set to zero at step 184.

At steps 186 and 188, the system iterates over iX and iY, respectively, incrementing iX at step 190. So long as both iX and iY are not greater than iSize, then the shiftedMatrix operation is performed at step 192. When iY becomes equal to iSize, then if rowSum(iX) is greater than 0 at step 194, the rowsMatched value is incremented at step 196. Then iY is reset to a value of 0 and iX is incremented by one at step 198.

At step 200, the DispersionScore is calculated. In the example provided in FIGS. 6A, 6B, and 6C, there is very little dispersion. All match sequences appear on rows 1 and 2. This indicates the sequences not only matched, but the fragments were very close to one another. The dispersion score is calculated as follows:

$$DispersionScore = ((RowLength - RowsMatched) + 1) / (RowLength)$$

Therefore, in the example data, the DispersionScore=((12−2)+1)/(12)=91.667%.

The RowWeight calculation at step 202 determines the significance of the rowSum values based on the row in which the value resides. Values in the upper rows are better matches than values from lower rows. RowWeight is determined by assigning 100% to row 0. Then each RowWeight for subsequent rows is reduced by a value of (1/(number of rows)) at step 202. Finally, the RowScore is computed by multiplying the RowPctOfSize value by the RowWeight value at step 204, as shown in the results of FIG. 6C.

The row score is now used to create an adjusted score based on the dispersion of the matches throughout the matrix. The DispersionScore is used to magnify the row score if it is larger than the row score, or diminish the row score if it is smaller than the row score. In the example data, the row score is 77.778%. The DispersionScore is 91.667%, which indicates that while the data values don't match exactly, the fragments are very close to each other. Therefore the adjusted score is modified to be higher than the initial row score. Specifically:

$$DispersionAdjustedScore = (DispersionScore - RowScore)/2 + RowScore$$

Therefore, in this example, DispersionAdjustedScore= (0.91667−0.7778)/2+0.77778=84.0277%. To perform this calculation, iX is set to a value of zero at step 208. As long as iX remains less than or equal to iSize, Score is recalculated at step 210 as the sum of the current Score value plus the product of the rowPctOfSize for iX and the rowWeight for ix. At step 212 the system iterates to the next iX value. Once iX exceeds iSize (in other words, the entire row has been processed), the DiversionAdjScore (adjusted diversion score) is calculated at step 214.

Finally, at step 216, the system returns a result object that contains the following properties:
 Value1 ("someonenice")
 Value2 ("someoneniece")
 RawScore (76.3888%)
 DispersionScore (91.667%)
 DispersionAdjustedScore (84.0277%)

The systems and methods described herein may in various embodiments be implemented by any combination of hardware and software. For example, in one embodiment, the methods may be implemented by a plurality of computer systems (e.g., each of which being a computer system as in FIG. 7) or a collection of computer systems, each of which includes one or more hardware processors executing program instructions stored on a computer-readable physical storage medium coupled to the hardware processors.

The program instructions may implement the functionality described herein (e.g., the functionality of various hardware servers and other components that implement the network-based cloud and non-cloud computing resources described herein). The various methods as illustrated in the figures and described herein represent example implementations. The order of any method may be changed, and various elements may be added, modified, or omitted.

Figure 7:
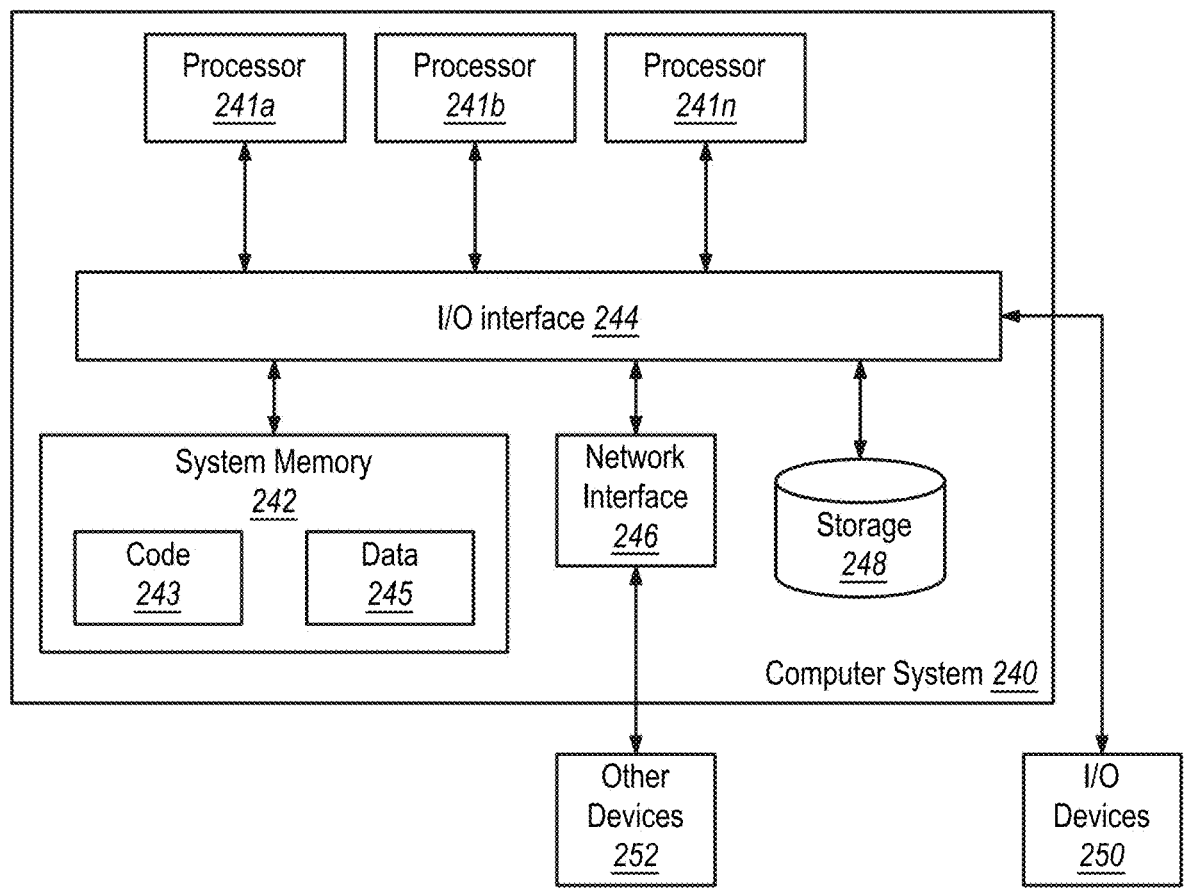
FIG. 7 is a diagram of a computer system component according to an embodiment of the present invention.

FIG. 7 is a block diagram illustrating an example computer hardware system, according to various embodiments. Computer system 240 may implement a hardware portion of a cloud computing system or non-cloud computing system, as forming parts of the various implementations of the present invention. Computer system 240 may be any of various types of hardware devices, including, but not limited to, a commodity server, personal computer system, desktop computer, laptop or notebook computer, mainframe computer system, handheld computer, workstation, network computer, a consumer device, application server, physical storage device, telephone, mobile telephone, or in general any type of computing node, compute node, compute device, and/or hardware computing device.

Computer system 240 includes one or more hardware processors 241a, 241b . . . 241n (any of which may include multiple processing cores, which may be single or multithreaded) coupled to a physical system memory 242 via an input/output (I/O) interface 244. Computer system 240 further may include a network interface 246 coupled to I/O interface 244. In various embodiments, computer system 240 may be a single processor system including one hardware processor 241a, or a multiprocessor system including multiple hardware processors 241a, 241b . . . 241n as illustrated in FIG. 7.

Processors 241a, etc. may be any suitable processors capable of executing computing instructions. For example, in various embodiments, processors 241a, etc. may be general-purpose or embedded processors implementing any of a variety of instruction set architectures. In multiprocessor systems, each of processors 241a, etc. may commonly, but not necessarily, implement the same instruction set.

The computer system 240 also includes one or more hardware network communication devices (e.g., network interface 246) for communicating with other systems and/or components over a communications network, such as a local area network, wide area network, or the Internet. For example, a client application executing on system 240 may use network interface 246 to communicate with a server application executing on a single hardware server or on a cluster of hardware servers that implement one or more of the components of the systems described herein in a cloud computing or non-cloud computing environment as implemented in various sub-systems. In another example, an instance of a server application executing on computer system 240 may use network interface 246 to communicate with other instances of an application that may be implemented on other computer systems.

In the illustrated embodiment, computer system 240 also includes one or more physical persistent storage devices 248 and/or one or more I/O devices 250. In various embodiments, persistent storage devices 248 may correspond to disk drives, tape drives, solid-state memory or drives, other mass storage devices, or any other persistent storage devices.

Computer system 240 (or a distributed application or operating system operating thereon) may store instructions and/or data in persistent storage devices 248, as desired, and may retrieve the stored instructions and/or data as needed. For example, in some embodiments, computer system 240 may implement one or more nodes of a control plane or control system, and persistent storage 248 may include the solid-state drives (SSDs) attached to that server node. Multiple computer systems 240 may share the same persistent storage devices 248 or may share a pool of persistent storage devices, with the devices in the pool representing the same or different storage technologies, including such technologies as described above.

Computer system 240 includes one or more physical system memories 242 that may store code/instructions 243 and data 245 accessible by processor(s) 241a, etc. The system memories 242 may include multiple levels of memory and memory caches in a system designed to swap information in memories based on access speed, for example. The interleaving and swapping may extend to persistent storage devices 248 in a virtual memory implementation, where memory space is mapped onto the persistent storage devices 248. The technologies used to implement the system memories 242 may include, by way of example, static random-access memory (RAM), dynamic RAM, read-only memory (ROM), non-volatile memory, solid-state memory, or flash-type memory. As with persistent storage devices 248, multiple computer systems 240 may share the same system memories 242 or may share a pool of system memories 242. System memory or memories 242 may contain program instructions 243 that are executable by processor(s) 241a, etc. to implement the routines described herein.

In various embodiments, program instructions 243 may be encoded in binary, Assembly language, any interpreted language such as Java, compiled languages such as C/C++, or in any combination thereof; the particular languages given here are only examples. In some embodiments, program instructions 243 may implement multiple separate clients, server nodes, and/or other components.

In some implementations, program instructions 243 may include instructions executable to implement an operating system (not shown), which may be any of various operating systems, such as UNIX, LINUX, Solaris™, MacOS™, or Microsoft Windows™. Any or all of program instructions 243 may be provided as a computer program product, or software, that may include a non-transitory computer-readable storage medium having stored thereon instructions, which may be used to program a computer system (or other electronic devices) to perform a process according to various implementations.

A non-transitory computer-readable storage medium may include any mechanism for storing information in a form (e.g., software or processing application) readable by a machine (e.g., a physical computer). Generally speaking, a non-transitory computer-accessible medium may include computer-readable storage media or memory media such as magnetic or optical media, e.g., disk or DVD/CD-ROM, coupled to or in communication with computer system 240 via I/O interface 244. A non-transitory computer-readable storage medium may also include any volatile or non-volatile media such as RAM or ROM that may be included in some embodiments of computer system 240 as system memory 242 or another type of memory. In other implementations, program instructions may be communicated using optical, acoustical or other form of propagated signals (e.g., carrier waves, infrared signals, digital signals, etc.) conveyed via a communication medium such as a network and/or a wired or wireless link, such as may be implemented via network interface 246. Network interface 246 may be used to interface with other devices 252, which may include other computer systems or any type of external electronic device.

In some embodiments, system memory 242 may include data store 245, as described herein. In general, system memory 242 and persistent storage 248 may be accessible on other devices 252 through a network and may store data blocks, replicas of data blocks, metadata associated with data blocks, and/or their state, database configuration information, and/or any other information usable in implementing the routines described herein.

In one embodiment, I/O interface 244 may coordinate I/O traffic between processors 241a, etc., system memory 242, and any peripheral devices in the system, including through network interface 246 or other peripheral interfaces. In some embodiments, I/O interface 244 may perform any necessary protocol, timing or other data transformations to convert data signals from one component (e.g., system memory 242) into a format suitable for use by another component (e.g., processors 241a, etc.).

In some embodiments, I/O interface 244 may include support for devices attached through various types of peripheral buses, such as a variant of the Peripheral Component Interconnect (PCI) bus standard or the Universal Serial Bus (USB) standard, as examples. Also, in some embodiments, some or all of the functionality of I/O interface 244, such as an interface to system memory 242, may be incorporated directly into processor(s) 241a, etc.

Network interface 246 may allow data to be exchanged between computer system 240 and other devices attached to a network, such as other computer systems (which may implement one or more storage system server nodes, primary nodes, read-only node nodes, and/or clients of the database systems described herein), for example. In addition, I/O interface 244 may allow communication between computer system 240 and various I/O devices 250 and/or remote storage 248.

Input/output devices 250 may, in some embodiments, include one or more display terminals, keyboards, keypads, touchpads, scanning devices, voice or optical recognition devices, or any other devices suitable for entering or retrieving data by one or more computer systems 240. These may connect directly to a particular computer system 240 or generally connect to multiple computer systems 240 in a cloud computing environment, grid computing environment, or other system involving multiple computer systems 240.

Multiple input/output devices 250 may be present in communication with computer system 240 or may be distributed on various nodes of a distributed system that includes computer system 240. In some embodiments, similar input/output devices may be separate from computer system 240 and may interact with one or more nodes of a distributed system that includes computer system 240 through a wired or wireless connection, such as over network interface 246.

Network interface 246 may commonly support one or more wireless networking protocols (e.g., Wi-Fi/IEEE 802.11, or another wireless networking standard). Network interface 246 may support communication via any suitable wired or wireless general data networks, such as other types of Ethernet networks, for example. Additionally, network interface 246 may support communication via telecommunications/telephony networks such as analog voice networks or digital fiber communications networks, via storage area networks such as Fibre Channel SANs, or via any other suitable type of network and/or protocol. In various embodiments, computer system 240 may include more, fewer, or different components than those illustrated in FIG. 7 (e.g., displays, video cards, audio cards, peripheral devices, or an Ethernet interface).

Any of the distributed system embodiments described herein, or any of their components, may be implemented as one or more network-based services in the cloud computing environment. For example, a read-write node and/or read-only nodes within the database tier of a hardware database system may present database services and/or other types of physical data storage services that employ the distributed storage systems described herein to clients as network-based services.

In some embodiments, a network-based service may be implemented by a software and/or hardware system designed to support interoperable machine-to-machine interaction over a network. A web service may have an interface described in a machine-processable format. Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol. To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

When a grouping is used herein, all individual members of the group and all combinations and subcombinations possible of the group are intended to be individually included.

When a range is stated herein, the range is intended to include all sub-ranges within the range, as well as all individual points within the range.

When "about," "approximately," or like terms are used herein, they are intended to include amounts, measurements, or the like that do not depart significantly from the expressly stated amount, measurement, or the like, such that the stated purpose of the apparatus or process is not lost.

All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A check fraud detection system comprising:
a global check register database configured to store known check data including at least check numbers, dates written, payee names, and amounts;
an image processor configured to:
receive an Image Cash Letter (X9) file containing check data and a check image;
extract check information from the X9 file;
analyze the check image using a vision artificial intelligence service to determine an observed payee name;
generate a resolution object containing results of the check image analysis; and
an event notification service configured to:
compare the observed payee name against a known payee name from the global check register database;
generate an event based on the comparison;
determine messaging preferences for users subscribed to receive notifications; and
transmit alert messages to the subscribed users based on their messaging preferences.

2. The system of claim 1, wherein the event notification service is further configured to:
create an event queue for storing event details;
fetch pending events from the event queue;
determine event types and account information for the pending events; and
track status of alert message delivery.

3. The system of claim 2, wherein the global check register database is configured to store the known check data with hashed account numbers to prevent reconstruction of actual account numbers.

4. A method for detecting check fraud, comprising:
receiving an Image Cash Letter (X9) file containing check data and a check image;
extracting check information from the X9 file;
retrieving known check data from a global check register database;
analyzing the check image using a vision artificial intelligence service to determine an observed payee name;
comparing the observed payee name against a known payee name from the known check data;
generating an event based on the comparison;
determining messaging preferences for users subscribed to receive notifications; and
transmitting alert messages to the subscribed users based on their messaging preferences.

5. The method of claim 4, further comprising the step of updating a resolution object with results from the vision artificial intelligence analysis.

6. The method of claim 5, wherein generating the event comprises:
creating an event message containing event type identifier, check identifier, and action type;
storing the event message in an event queue; and
processing pending events from the event queue according to event type and account information.

7. The method of claim 6, further comprising the step of performing a comparative text scoring process to determine a similarity score between the observed payee name and the known payee name when an exact match is not found.

8. The method of claim 7, wherein the comparative text scoring process comprises:
creating a comparison matrix based on character-by-character comparison of the observed payee name and known payee name;
calculating a raw score based on matching characters;
calculating a dispersion score based on the distribution of matching characters; and
calculating an adjusted score based on the raw score and dispersion score.

9. The method of claim 8, further comprising:
receiving check data from an accounting system integrated with the global check register database;
storing the check data with hashed account numbers; and
updating the global check register database with the received check data prior to processing any X9 files containing images of checks written from the accounting system.

10. The method of claim 9, wherein the step of transmitting alert messages comprises:
determining whether a transmitted alert message was successfully delivered;
creating a system administrator alert upon failed message delivery;
updating event tracking status to reflect successful or failed message delivery; and
providing a hypertext link in successfully delivered messages to allow recipients to immediately view event details.

* * * * *